United States Patent [19]

Kuwano et al.

[11] 3,920,091

[45] Nov. 18, 1975

[54] SHOCK ABSORBING DEVICE FOR SKIS OF SNOW MOBILES

[75] Inventors: Nobuyori Kuwano, Fukiage; Takayoshi Tsuchiya, Kasugai, both of Japan

[73] Assignee: Showa Manufacturing Co., Ltd., Tokyo, Japan

[22] Filed: June 25, 1973

[21] Appl. No.: 373,376

[30] Foreign Application Priority Data
Feb. 26, 1973 Japan..............................222138

[52] U.S. Cl................................ 180/5 R; 280/21 R
[51] Int. Cl.²......................................... B62M 27/02
[58] Field of Search .......... 180/5 R; 280/25, 26, 21, 280/21 R, 21 A, 22, 124 F

[56] References Cited
UNITED STATES PATENTS

| | | | |
|---|---|---|---|
| 3,550,706 | 12/1970 | Watkins ............................ | 280/21 R |
| 3,563,566 | 2/1971 | Weber ............................. | 280/124 F |
| 3,613,812 | 10/1971 | Hetteen............................. | 180/5 R |
| 3,705,749 | 12/1972 | Harvey.............................. | 180/5 R |
| 3,724,578 | 4/1973 | Erickson ........................... | 180/5 R |

*Primary Examiner*—Philip Goodman
*Assistant Examiner*—John A. Carroll
*Attorney, Agent, or Firm*—A. W. Breiner

[57] ABSTRACT

A shock absorbing device for skis of snow mobiles wherein a shock absorber is connected at the lower end with a ski at a distance from the connecting part of a spindle and at the upper end directly with the body of the car so that the shock absorber may be vertical, long enough, therefore large enough in the extension and contraction, therefore comparatively small in the damping force and freely adjustable in the characteristics, may generate a damping force even with the fluttering of the ski and may further have an action as of a steering damper.

5 Claims, 4 Drawing Figures

SHOCK ABSORBING DEVICE FOR SKIS OF SNOW MOBILES

This invention relates to shock absorbing devices for skis of snow mobiles.

A shock absorber for a ski in a snow mobile has been fitted in either of two ways. That is to say, in the first fitting method, a bracket is fixed in the center of the upper part of a leaf spring fitted arcuately in the lengthwise direction of the ski, a spindle to support the car body is connected at one end with the base part of said bracket through a shaft and an oil pressure shock absorber is fitted between the tip of the above mentioned bracket and the front part of the ski. In the other fitting method, an arm extending in front of and substantially at right angles with the above mentioned spindle is formed at the lower end of said spindle and a shock absorber is fitted between the tip of the arm and the front part of the ski.

However, in either method, the degree of the extension and contraction of the shock absorber with the deflection of the leaf spring is so small that a very large damping force is required and it is difficult to obtain a proper damping force. Further, as the shock absorber is fitted at an incline, in order to prevent the piston from coming out above the oil level, the outside diameter must be made very large. Further, in the above mentioned first fitting method, no shock absorbing effect is obtained at all with fluttering of the ski. In the second fitting method, the damping force is so large that fluttering is suppressed more than is necessary and no favorable effect in riding comfort is obtained.

An object of the present invention is to provide a shock absorbing device for skis wherein such defects as are described above are eliminated and at the same time a steering damper effect can be obtained.

Figure 1:
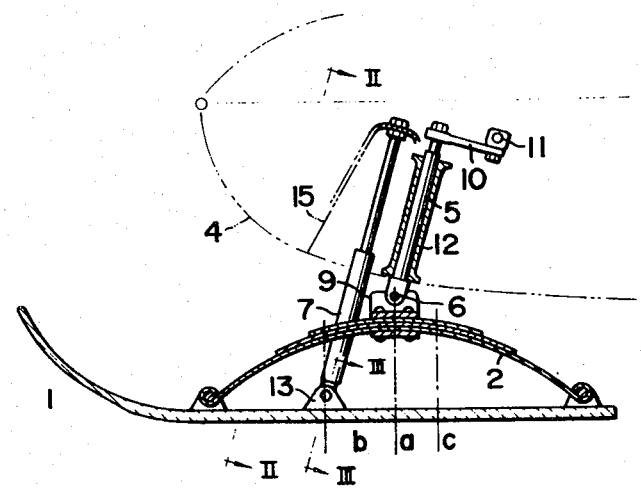
FIG. 1 is a vertically sectioned view of an embodiment of the present invention.
Figure 2:
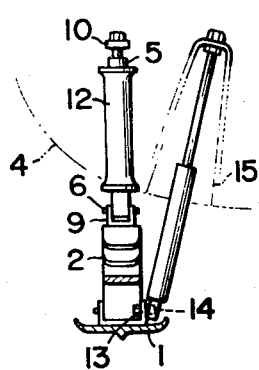
FIG. 2 is a magnified sectioned view on line II—II in FIG. 1.
Figure 3:
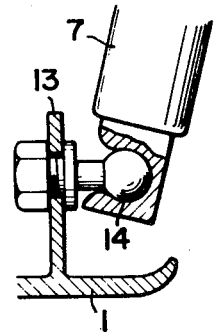
FIG. 3 is a magnified sectioned view on line III—III in FIG. 1.

In FIGS. 1 to 3, a ship-shaped car body 4 is fitted on the rear part with driving endless tracks (not illustrated) and on each side of the front part with a ski 1. A leaf spring 2 is fitted to this ski 1, a spindle 5 is connected at the lower end through a shaft 6 with a bearing metal 9 fixed in the center of the upper part of said leaf spring and at the upper end with a tie rod 11 connected with a handle through a steering arm 10. A holding tube 12 for the above mentioned spindle 5 is fixed to the car body 4. The ski 1 rotates in the horizontal plane by the operation of the handle so as to be steered. Further, the leaf spring 2 is deflected by irregularities on the snow surface to reduce shocks to the car body and the ski 1 rotates in the vertical plane around the shaft 6 as a center so that the ski may be held in close contact with the snow surface and may be kept steerable. A bearing metal 13 is provided in a position at a proper distance $b$ in front of the connecting part of the spindle 5 in such ski 1 as is described above and an oil pressure shock absorber 7 is connected at the lower end with the above mentioned bearing metal 13 through a universal joint 14. For example, as shown in FIG. 3, this universal joint is a ball fixed to the bearing metal 13 so that the shock absorber may be fitted at the lower end to said ball and may incline in any direction. As shown in FIG. 2, said oil pressure shock absorber is inclined inward at the upper part to the vertical plane passing through the center of the car body and is connected at the upper end with the bottom surface of a concave part 15 formed in the car body through such elastic body as of rubber so as to be somewhat rockable.

Figure 4:
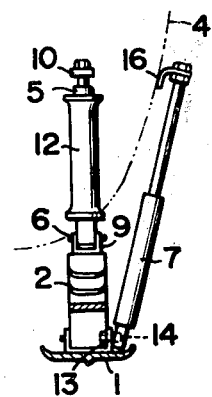
FIG. 4 is a vertically sectioned elevation of a part of another embodiment of the present invention.

Further, in FIG. 4 which is a vertically sectioned elevation of the same part as in FIG. 2 in another embodiment of the present invention, the shock absorber 7 is connected at the lower end with the outside of the ski 1 through a universal joint 14 and in the upper part as inclined outward with a bearing metal 16 fixed to the side of the car body through an elastic body.

If desired a universal joint can be used also in the part connecting the shock absorber 7 at the upper end with the car body 4 or the part connecting the shock absorber at the lower end with the ski 1 can be arranged in the rear of the connecting part $a$ of the spindle as shown by the chain line $c$ in FIG. 1.

In the device of the present invention, as the shock absorber 7 is connected at the upper end directly with the car body 4 as described above, it can be erected substantially vertically and can be formed to be long enough. Therefore, the degree of the extension and contraction of the shock absorber with the deflection of the leaf spring for suspending the car body is large enough, therefore the damping force can be made comparatively small and the characteristics of the shock absorber can be freely adjusted. Further, the oil pressure shock absorber 7 is connected at the lower end in a position at a proper distance $b$ in front or rear of the connecting part of the spindle 5. Therefore, even with the fluttering of the ski 1, a damping force is generated in the shock absorber 7 and its size can be adjusted with the distance $b$ to improve the riding comfort.

As the shock absorber 7 is connected at the lower end with the ski through the universal joint, the ski can be freely rotated by operating the handle to change the direction. Further, as the shock absorber is fitted as inclined to the vertical plane passing through the center of the car body, by the rotation of the ski in the horizontal plane, the shock absorber is extended and contracted and a damping force is generated. Therefore, the oil pressure shock absorber 7 acts also as a steering damper and the handle can be operated stably.

What is claimed is:

1. A snow mobile comprising a body having endless driving tracks at the rear thereof, and skis fitted on each side of the front part of said body; said skis being fitted to said body by (1) a suspension spring connected at substantially the center thereof to the lower end of spindle means, said spindle means being connected at the upper end thereof to said body through a steering arm and tie rod; and (2) oil pressure shock absorber means connected to said ski at its lower end by a universal joint substantially adjacent to said ski and pivotably connected at its upper end to said body, said spindle means and shock absorber means being constructed and arranged whereby the shock absorber is substantially perpendicular to said ski and substantially parallel to said spindle means when viewed from the side, and the distance between said spindle means and shock absorber is such as to provide a dampening force while substantially reducing or eliminating fluttering of said ski.

2. A snow mobile according to claim 1 wherein said universal joint is a ball fixed to a bearing metal provided on the ski.

3. A snow mobile according to claim 1 wherein said shock absorber is pivotably connected at its upper end with a concave part formed in the bottom of said body through an elastic body.

4. A snow mobile according to claim 1 wherein said shock absorber is inclined at the upper end outward of said body and is connected through an elastic body with a bearing metal fixed to the side of said body.

5. A snow mobile according to claim 1 wherein the steering means comprises a holding tube fixed to the body of said snow mobile, and said spindle passes through said holding tube and connected at its lower end with the center of said suspension spring on said ski and at the other end with a steering arm connected with a tie rod and a handle connected with said tie rod so that the ski may be rotated in the horizontal plane by the operation of said handle.

* * * * *

UNITED STATES PATENT AND TRADEMARK OFFICE
CERTIFICATE OF CORRECTION

PATENT NO. : 3,920,091
DATED : November 18, 1975
INVENTOR(S) : Nobuyori Kuwano et al It is certified that error appears in the above-identified patent and that said Letters Patent are hereby corrected as shown below:

Title Page, in the heading, the Priority Data should read:
    --Feb. 26, 1973   Japan...... 48-22138

Column 2, line 17, after "desired" insert --, --.

Signed and Sealed this

Seventeenth Day of May 1977

[SEAL]

Attest:

RUTH C. MASON
*Attesting Officer*

C. MARSHALL DANN
*Commissioner of Patents and Trademarks*